United States Patent
Studer et al.

(10) Patent No.: US 8,341,874 B2
(45) Date of Patent: Jan. 1, 2013

(54) PEST CONTROL DEVICE WITH GLUEBOARD GUIDE

(75) Inventors: Bruce R. Studer, Germantown, WI (US); Timothy M. Jones, Phoenix, AZ (US)

(73) Assignee: Gardner Manufacturing Co., Inc., Horicon, WI (US)

( * ) Notice: Subject to any disclaimer, the term of this patent is extended or adjusted under 35 U.S.C. 154(b) by 301 days.

(21) Appl. No.: 12/832,277

(22) Filed: Jul. 8, 2010

(65) Prior Publication Data

US 2012/0005947 A1    Jan. 12, 2012

(51) Int. Cl.
*A01M 1/14* (2006.01)
*A01M 1/04* (2006.01)

(52) U.S. Cl. ............................. 43/114; 43/113; 43/115

(58) Field of Classification Search ............ 43/113–115
See application file for complete search history.

(56) References Cited

U.S. PATENT DOCUMENTS

| | | | |
|---|---|---|---|
| 485,815 A | 11/1892 | Koecher | |
| 638,413 A | 12/1899 | Hobbs | |
| 768,734 A | 8/1904 | Clark | |
| 771,662 A | 10/1904 | Peck | |
| 783,255 A * | 2/1905 | Foote | 43/116 |
| 1,148,748 A * | 8/1915 | Brewer | 43/113 |
| 1,577,148 A * | 3/1926 | Pical | 43/115 |
| 1,602,677 A | 10/1926 | Jorgensen | |
| 2,249,718 A | 7/1941 | Travnicek | |
| 2,873,551 A * | 2/1959 | Misko | 43/114 |
| 2,962,836 A * | 12/1960 | Hughes | 43/114 |
| 3,956,848 A | 5/1976 | Job | |
| 3,968,590 A * | 7/1976 | Kitterman | 43/114 |
| 4,074,457 A * | 2/1978 | Sato et al. | 43/113 |
| 4,161,079 A * | 7/1979 | Hill | 43/114 |
| 4,815,231 A * | 3/1989 | McQueen | 43/114 |
| 5,148,624 A * | 9/1992 | Schmidt | 43/81 |
| 5,272,832 A | 12/1993 | Marshall et al. | |
| 5,325,625 A * | 7/1994 | Liu et al. | 43/114 |
| 5,425,197 A * | 6/1995 | Smith | 43/113 |
| 5,446,992 A | 9/1995 | Stewart | |
| 5,448,852 A | 9/1995 | Spragins et al. | |
| 5,481,824 A | 1/1996 | Fiore, Jr. | |
| 5,513,465 A * | 5/1996 | Demarest et al. | 43/113 |
| 5,588,250 A * | 12/1996 | Chiba et al. | 43/114 |
| 5,608,987 A * | 3/1997 | Meyer | 43/113 |
| 5,634,292 A * | 6/1997 | Kitterman | 43/115 |
| 5,651,211 A | 7/1997 | Regan et al. | |
| 5,713,153 A * | 2/1998 | Cook et al. | 43/114 |
| 5,806,237 A | 9/1998 | Nelson et al. | |
| 5,915,948 A * | 6/1999 | Kunze et al. | 43/114 |
| 5,930,944 A | 8/1999 | Knuppel | |
| 5,950,353 A * | 9/1999 | Johnson et al. | 43/114 |
| 5,966,863 A | 10/1999 | Payton et al. | |
| 6,082,042 A | 7/2000 | Issitt | |

(Continued)

FOREIGN PATENT DOCUMENTS

DE    3810065 C1 *    4/1989

(Continued)

*Primary Examiner* — Darren W Ark

(74) *Attorney, Agent, or Firm* — Thomas J. Nikolai; Nikolai & Mersereau, P.A.

(57) ABSTRACT

A pest control device uses a replaceable glueboard to immobilize pests attracted to the pest control device. A unique guide is provided to help prevent the adhesive surface of the glueboards from coming into contact with other surfaces of the pest control device during installation and removal of such glueboards.

10 Claims, 6 Drawing Sheets

U.S. PATENT DOCUMENTS

| | | | |
|---|---|---|---|
| 6,108,965 A * | 8/2000 | Burrows et al. | 43/113 |
| 6,108,966 A * | 8/2000 | Otomo et al. | 43/113 |
| 6,125,576 A | 10/2000 | Knuppel | |
| 6,182,482 B1 | 2/2001 | Issitt | |
| 6,202,339 B1 * | 3/2001 | Knuppel | 43/114 |
| 6,230,434 B1 | 5/2001 | Knuppel | |
| 6,289,629 B2 * | 9/2001 | Greening | 43/113 |
| 6,370,813 B1 | 4/2002 | Nelson et al. | |
| 6,389,738 B1 * | 5/2002 | Denny et al. | 43/58 |
| 6,393,759 B1 * | 5/2002 | Brown et al. | 43/113 |
| D459,428 S | 6/2002 | Johnson et al. | |
| 6,397,515 B1 * | 6/2002 | Brown et al. | 43/113 |
| 6,397,517 B1 | 6/2002 | Leyerle et al. | |
| 6,415,544 B1 | 7/2002 | Leyerle et al. | |
| 6,442,889 B1 * | 9/2002 | Lee | 43/114 |
| 6,481,151 B1 | 11/2002 | Johnson et al. | |
| 6,493,988 B1 | 12/2002 | Johnson | |
| 6,560,919 B2 * | 5/2003 | Burrows et al. | 43/113 |
| 6,574,914 B2 * | 6/2003 | Smith | 43/113 |
| 6,618,983 B1 * | 9/2003 | Spragins | 43/114 |
| 6,622,422 B2 | 9/2003 | Gehret et al. | |
| 6,631,582 B2 | 10/2003 | Knuppel et al. | |
| 6,655,078 B2 * | 12/2003 | Winner et al. | 43/114 |
| 6,691,452 B1 | 2/2004 | Knuppel et al. | |
| 6,694,669 B2 | 2/2004 | Gehret et al. | |
| 6,735,899 B1 | 5/2004 | Anderson et al. | |
| 6,735,900 B2 | 5/2004 | Wiesener et al. | |
| 6,775,947 B2 | 8/2004 | Anderson et al. | |
| 6,796,081 B2 | 9/2004 | Anderson et al. | |
| 6,807,768 B2 | 10/2004 | Johnson et al. | |
| 6,871,443 B2 * | 3/2005 | Lambert et al. | 43/113 |
| 6,886,292 B2 * | 5/2005 | Studer et al. | 43/113 |
| 6,920,716 B2 * | 7/2005 | Kollars et al. | 43/114 |
| 6,955,007 B2 | 10/2005 | Gehret et al. | |
| 6,990,766 B2 | 1/2006 | Gehret et al. | |
| 7,096,621 B2 * | 8/2006 | Nelson et al. | 43/113 |
| 7,284,350 B2 * | 10/2007 | Nelson et al. | 43/113 |
| D566,551 S | 4/2008 | Pettigrew et al. | |
| 7,363,744 B2 | 4/2008 | Kness et al. | |
| 7,383,660 B2 * | 6/2008 | Greening | 43/113 |
| 7,458,182 B2 | 12/2008 | Johnson | |
| 7,856,752 B1 * | 12/2010 | Eilersen | 43/114 |
| 8,104,223 B1 * | 1/2012 | Rodriguez | 43/115 |
| 8,240,081 B2 * | 8/2012 | Cuellar Bernal | 43/114 |
| 2001/0001353 A1 * | 5/2001 | Jones | 43/114 |
| 2005/0102889 A1 * | 5/2005 | Hoyes | 43/114 |
| 2006/0107583 A1 * | 5/2006 | Wu | 43/113 |
| 2006/0265941 A1 * | 11/2006 | Newton | 43/114 |
| 2007/0124987 A1 * | 6/2007 | Brown et al. | 43/113 |
| 2009/0139155 A1 * | 6/2009 | Kelders | 43/113 |
| 2009/0158636 A1 * | 6/2009 | Rosario | 43/114 |
| 2009/0288333 A1 * | 11/2009 | Johnston et al. | 43/113 |
| 2010/0263260 A1 * | 10/2010 | Engelbrecht et al. | 43/113 |
| 2011/0016769 A1 * | 1/2011 | Cink et al. | 43/114 |
| 2011/0041384 A1 * | 2/2011 | Willcox et al. | 43/113 |

FOREIGN PATENT DOCUMENTS

| | | | |
|---|---|---|---|
| EP | 659339 A2 * | 6/1995 | |
| FR | 2775159 A1 * | 8/1999 | |
| GB | 2456585 A * | 7/2009 | |
| GB | 2459717 A * | 11/2009 | |
| JP | 07170896 A * | 7/1995 | |
| JP | 10084836 A * | 4/1998 | |
| JP | 10108607 A * | 4/1998 | |
| JP | 2000157137 A * | 6/2000 | |
| JP | 2001211805 A * | 8/2001 | |
| JP | 2003180220 A * | 7/2003 | |
| JP | 2004105058 A * | 4/2004 | |
| JP | 2005341921 A * | 12/2005 | |
| JP | 2006230376 A * | 9/2006 | |
| JP | 2007000008 A * | 1/2007 | |
| JP | 2008092803 A * | 4/2008 | |
| JP | 2008092804 A * | 4/2008 | |
| JP | 2008173026 A * | 7/2008 | |
| JP | 2008193942 A * | 8/2008 | |
| JP | 2009296987 A * | 12/2009 | |
| JP | 2011250723 A * | 12/2011 | |
| JP | 2011254746 A * | 12/2011 | |
| WO | WO 0122813 A2 * | 4/2001 | |
| WO | WO 2005082139 A1 * | 9/2005 | |
| WO | WO 2006056729 A1 * | 6/2006 | |
| WO | WO 2009099278 A2 * | 8/2009 | |

* cited by examiner

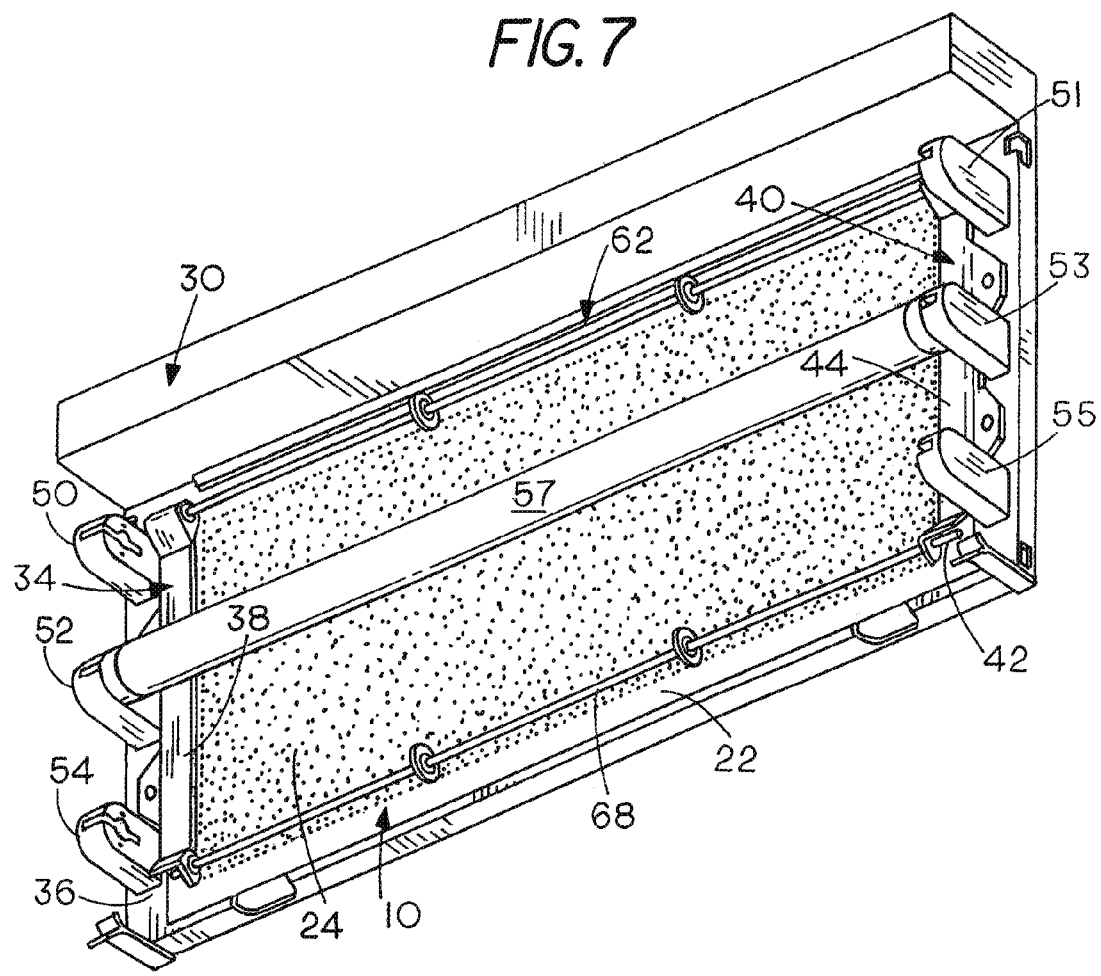

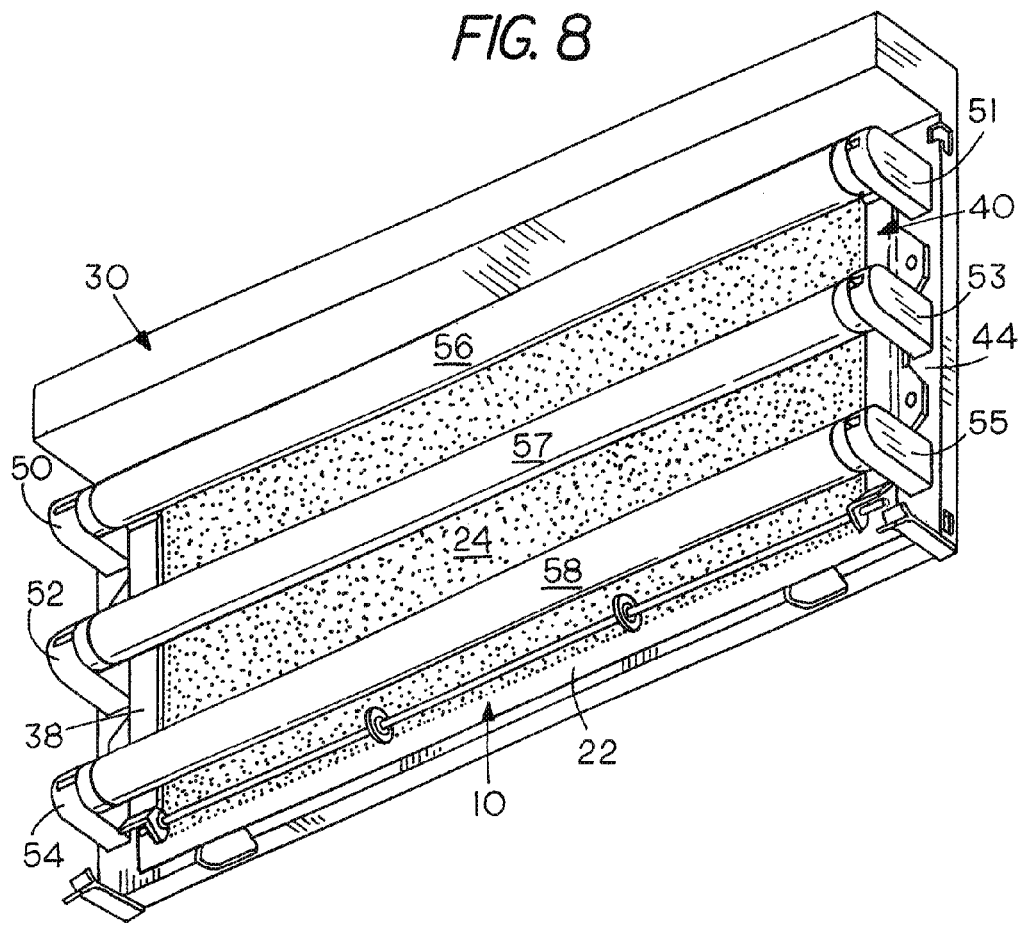

PEST CONTROL DEVICE WITH GLUEBOARD GUIDE

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates to pest control devices, and more particularly to pest control devices which incorporate a replaceable glueboard to immobilize pests.

II. Related Art

Historically, a variety of pest control devices have been employed to trap rodents, insects and other pests. Such pest control devices have typically employed some attraction mechanism for luring pests to the pest control device. Such attraction mechanisms have included baits such as food, pheromones or other odorous materials found attractive by the pest. Such mechanisms have also included light sources. Ultraviolet lamps have proven to be a useful and effective lure when trapping flying insects. Pest control devices have likewise historically included an immobilization mechanism preventing the pest from exiting the pest control device. One type of immobilization mechanism commonly used is substrate such as a board, paper or other medium having a surface coated with an adhesive. Pests attracted to the pest control device or incidentally coming into contact with the adhesive become trapped by adhesion.

One type of adhesively-coated substrate is commonly referred to as a "glueboard". As the name suggests, a glueboard is a disposable board made of stiff paper, cardboard, corrugated plastic or other suitable material with an adhesive layer on one of the surfaces. For packaging and shipping purposes, the adhesive layer is covered by a release paper. The release paper is, of course, removed prior to use to expose the adhesive layer so pests can come into contact with the adhesive layer and become entrapped. Such disposable glueboards are routinely replaced to ensure the continued efficacy of the pest control device and to dispose of the pests immobilized by the glueboard.

While the adhesives employed when manufacturing glueboards have proved to be highly effective for trapping insects and other small animals, the nature of the adhesive is such that insertion and removal of the glueboard from the pest control device can be problematic. If the adhesive surface of the glueboard accidently comes into contact with other surfaces of the pest control device, the adhesive will cause the glueboard to stick to those surfaces. Likewise, if the skin or clothing of a person installing or removing glueboard comes into contact with the adhesive surface, the glueboard will stick to the person or the person's clothing.

Efforts have been made in the past to address such concerns. By way of example, various cartridges have been developed to enclose a substrate having a surface coated with an adhesive. See, for example, U.S. Pat. No. 6,871,443 granted to Lambert et al on Mar. 29, 2005 and U.S. Pat. No. 5,651,211 to Regan et al granted Jul. 29, 1997. While such cartridges do prevent the adhesive surface from coming into contact with the outer surface of the light sources and other surfaces of the trap and are also useful in diminishing the risk an installer or the installer's clothing will come into contact with the adhesive surfaces, such cartridges tend to be relatively expensive and complicated to assemble. Likewise, they often incorporate bracing or grids reducing the size of the area of the adhesive surface which is exposed and thus capable of trapping pests.

Prior to the invention disclosed and claimed herein there existed a real need for an inexpensive solution to reduce the risk that the adhesive surface of a glueboard will come into contact with the other surfaces of the insect trap or the skin or clothing of a person installing or removing a glueboard.

SUMMARY OF THE INVENTION

A unique and novel pest control device is described. The pest control device comprises a replaceable glueboard of a defined thickness having at least one edge extending between back and front surfaces, the front surface having a peripheral section adjacent the at least one edge and a central section, and an adhesive coating covering the central section. The pest control device further comprises a housing having a space in which the replaceable glueboard is received and retained. This space is defined by at least one channel, the channel having an opening into which the at least one edge of the glueboard is inserted and a lip for retaining the at least one edge of the glueboard within the channel. The lip of the channel and the peripheral section of the glueboard are dimensioned so the adhesive coating of the glueboard does not come into contact with the lip as the glueboard is inserted into, retained within or removed from the space of the housing. The pest control device also includes a guide engaging and guiding the glueboard during insertion of the glueboard into and removal of the glueboard from the space of the housing. The guide engages the front surface of the glueboard as the glueboard is inserted into and removed from the space to prevent the adhesive coating covering the central section of front surface of the glueboard from coming into contact with other surfaces of the pest control device. The guide has an edge engaging the front surface of the glueboard. This edge of the guide is sufficiently narrow to prevent the guide from sticking to the adhesive coating. In certain embodiments, the guide comprises an axle supported by one or more bearings having at least one wheel mounted thereon. In these embodiments the edge(s) of the guide coming into contact with the front surface of the glueboard is the outer edge of the wheel(s). A plurality of such guides may be provided.

The axle of the guides may be made flexible to accommodate glueboards having differing defined thicknesses. The axle of the guides may also be resilient so the wheel(s) mounted thereon slightly pinch the glueboard against a portion of the housing. Also, the wheel(s) mounted on the axle of a guide may rotate during insertion and removal of the glueboard edges from the channels and the glueboard from the space. While the pest control device may include a pest attractant incorporated into the glueboard, the pest control device may either alternatively or additionally include a separate pest attractant in a second space which is located adjacent the space in which the replaceable glueboard is located. This separate pest attractant can be of any suitable type—one example being a light source. One of the functions of the guide is to ensure the adhesive surface of the glueboard does not come into contact with the separate attractant (or other surfaces) as the replaceable glueboard is inserted or removed.

BRIEF DESCRIPTION OF THE DRAWINGS

FIG. 7 is a perspective view like FIG. 6, but with the glueboard fully inserted into the housing.

FIG. 8 is a perspective view like FIGS. 6 and 7, but with all three light sources in place.

DETAILED DESCRIPTION OF THE PREFERRED EMBODIMENT

Figure 1:
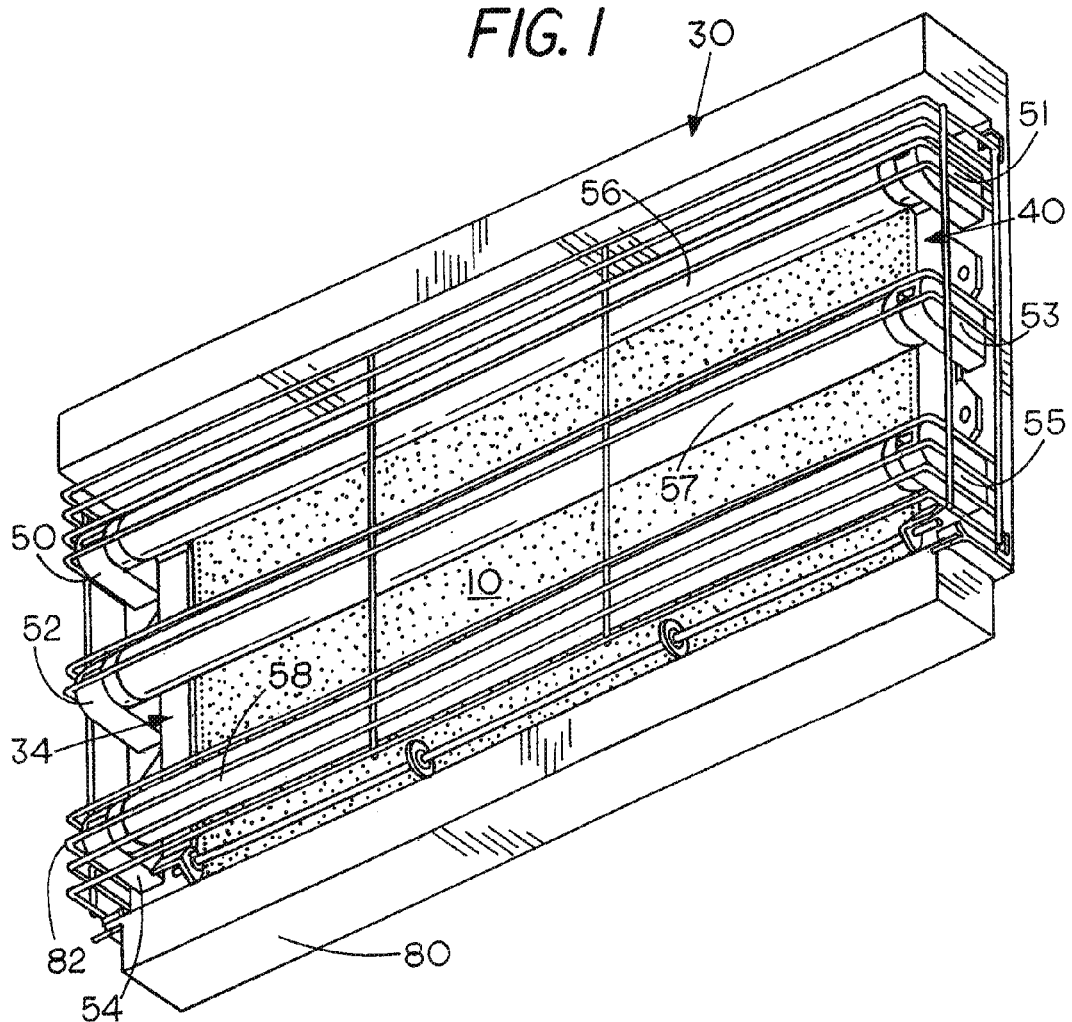
FIG. 1 is a perspective view of a flying insect trap.

FIG. 1 shows one of many different flying insect traps which may be made in accordance with the present invention. The flying insect trap shown includes a glueboard 10, a housing 30, three ultraviolet light sources 56, 57 and 58, a removable pan 80, and a removable cage 82. The removable cage 82 prevents people from inadvertently coming into contact with and being potentially burned by the light sources 56, 57 and 58 while at the same time permitting ingress of flying insects into the caged area.

Figure 5:
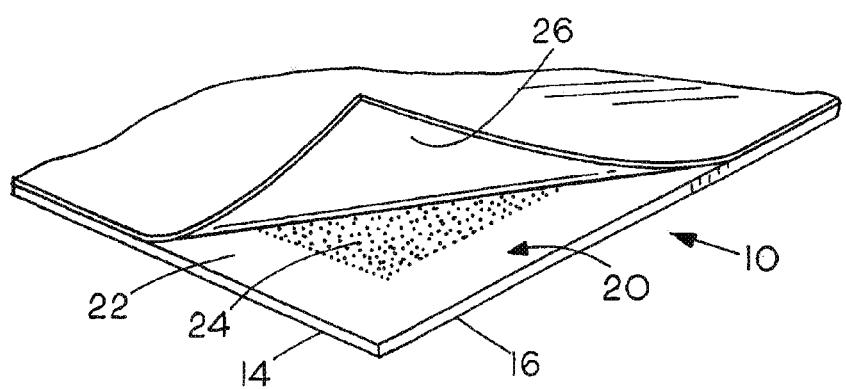
FIG. 5 is a partial perspective view of the glueboard of the flying insect trap of FIG. 1.

Glueboards 10 of the type used may be of a variety of shapes. As shown in the drawings, the glueboard 10 is rectangular in shape having a first edge 12 parallel to a second edge 14 and a third edge 16 parallel to a fourth edge 18 extending between first and second surfaces. The first or back surface has no adhesive coating. The second or front surface 20 has a peripheral section 22 adjacent the edges 12, 14, 16 and 18 and a center section 24. The center section 24 is coated with a suitable adhesive for immobilizing the pests to be captured by the pest control device. The peripheral section 22 is typically not coated with such an adhesive to promote ease of handling. FIG. 5 also shows a release paper 26 which covers the adhesive layer of the center section 24 during shipping and handling to prevent unintended items from sticking to the center section 24. The release paper 26 is removed at the time the glueboard 10 is placed into service as illustrated in FIGS. 1 and 6-8.

Figure 2:
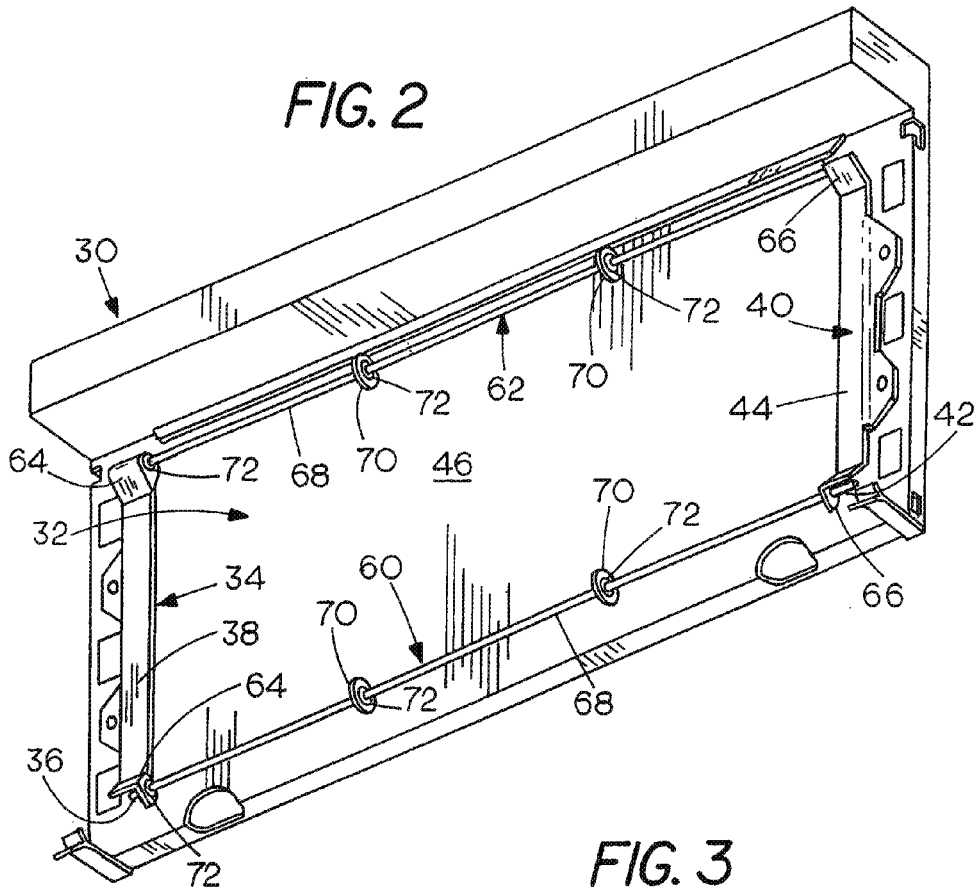
FIG. 2 is a perspective view of the housing of the flying insect trap shown in FIG. 1.
Figure 3:
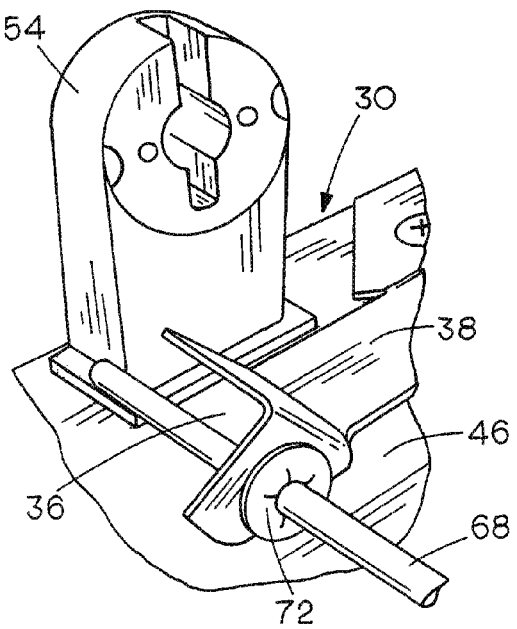
FIG. 3 is a partial perspective view showing the bearing and axle assembly of the housing of FIG. 2.
Figure 4:
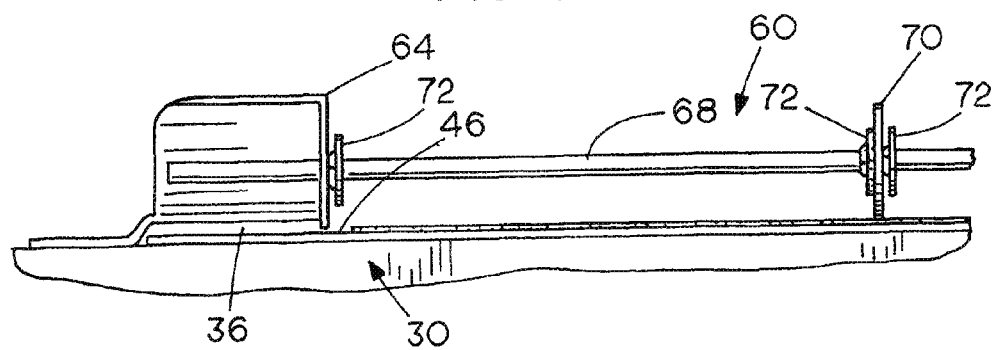
FIG. 4 is a partial front elevational view of the bearing, axle and wheel assembly of the housing of FIG. 2.
Figure 6:
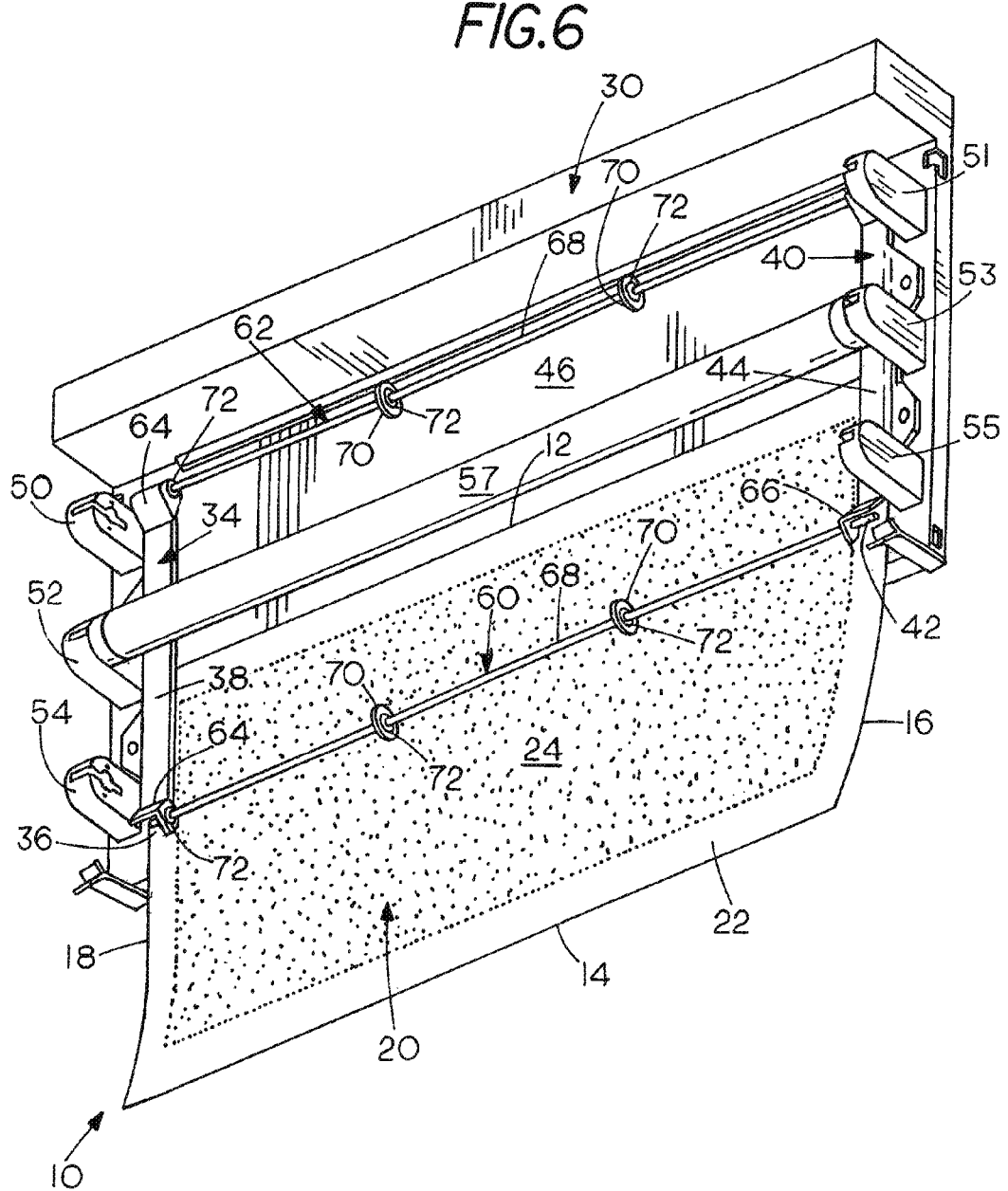
FIG. 6 is a perspective view showing the glueboard partially inserted into the housing showing how the glueboard interacts with the channels and the axle and wheel assemblies of the housing. Two of the light sources are not shown in the drawing to make it easier for one to view the axle and wheel assemblies.

As best shown in FIGS. 2 and 6, the housing 30 includes a space 32 in which a glueboard 10 is received and retained. As shown in the drawings, the space 32 is defined by a first channel 34, a second channel 40, and a support surface 46. Alternatively, a single U-shaped channel could be employed. The first channel 34 has at least one open end 36 and a lip 38 for retaining edge 18 of the glueboard 10. The second channel 40 has at least one open end 42 and a lip 44 for retaining edge 16 of the glueboard 10. The dimensions of the lips 38 and 44 and the peripheral section 22 are such that the adhesive coating of the glueboard 10 never comes into contact with lips 38 and 44. When the glueboard 10 is located within the space 32, the front surface 20 of the glueboard 10 and adhesive coating over the center section 24 face away from a support surface 46 of the housing 30. As such, the back surface of the glueboard 10, which is not coated with adhesive, is in face-to-face registration with the support surface 46.

As shown in FIGS. 1-3 and 6-8, the housing 30 also includes electrical fittings 50-55 for physically and electrically coupling three ultraviolet (UV) light sources 56-58 to the housing. The UV light sources, when energized, give off UV light which is known to be attractive to insects. As shown, the UV light sources 56-58 are positioned in front of and spaced from the channels 34 and 40 and the glueboard 10 and extend across the support surface 46 and glueboard 10. When the UV light sources 56-58 are illuminated, insects attracted by the UV light will fly about the light sources 56-58, come into contact with the adhesive and adhere to the glueboard 10. Of course, if the glueboard 10 is not replaced regularly, the adhesive can dry out and loose its adhesive properties in which case any dead insects will fall into pan 80. While the drawings show UV light sources being employed, other types of attractants can be employed either in lieu of or in addition to such light sources.

The drawings also show a pair of guides 60 and 62. As shown, each guide includes a first bearing 64 and a second bearing 66 which support opposite end sections of an axle 68. Mounted along each axle 68 between the two bearings 64 and 66 are narrow wheels 70 and a plurality of stops 72. The stops 72 prevent the axle 68 from unintentionally becoming disconnected from the bearings 64 and 66 and the wheels from sliding along the axle. The wheels 70 have an axis of rotation along the same longitudinal line as the axle 68. The wheels 70 can either be fixed to the axle 68, in which case the bearings 64 and 66 permit the axle to rotate, or the wheels can rotate about the axle 68. The wheels 70 terminate in a narrow outer edge to ensure the adhesive of the glueboard 10 does not cause the wheels 70 to stick to the glueboard 10.

The wheels 70 of guide 60 provide at least two very important functions when the edges 16 and 18 of a replaceable glueboard 10 are being inserted into or removed from the channels 34 and 40 of the housing 30. Specifically, the wheels 70 guide the glueboard 10 so the edges 16 and 18 enter the channels 34 and 40. The wheels 70 also prevent the adhesive-coated center section of the glueboard from coming into contact with the outer surfaces of bulbs 56-58 or other surfaces of the housing 30. Guides having other configurations can also provide this function without deviating from the invention so long as any edge of the guide coming into contact with the adhesive coating is thin enough to prevent an adhesive bond from being formed between the glueboard and the guide.

A second guide 62 may be added at the opposite end of space 32 and channels 34 and 40 for additional security. When a second guide 62 is provided, the guides 60 and 62 cooperate with the lips 38 and 44 of the channels 34 and 40 to ensure the glueboard 10 does not move, warp or otherwise change position in a fashion which could permit the adhesive of glueboard 10 to come into contact with the outer surfaces of light sources 56-58 or other surfaces of the housing 30.

From the drawings, it should be appreciated that the thickness of the glueboard 10, at least at the peripheral section 22, should be less than the distance between the lips 38 and 44 and the support surface 46 so the edges 12 and 14 of the glueboard 10 can be slid between the lips 38 and 44 and the support surface 46. As noted above, the depth of the lips 38 and 44 and the peripheral section 22 of the glueboard 10 should be dimensioned so adhesive from the glueboard 10 does not come into contact with the lips 38 and 41. The axles 68 may also be made of a flexible yet resilient material to allow for variations in the thickness of the replaceable glueboard 10 and provide a slightly-pinching force against the glueboard 10 between the wheels 70 and the support surface 46.

The drawings and the description provided above are designed to meet the disclosure requirements of the patent laws, but the invention is not limited to the embodiment disclosed. Variations can be made without deviating from the invention. By way of example, a different number or type of lights may be employed as the pest attractant. Pest attractants other than light sources may be employed including, but not limited to, pheromones and other odorous materials embedded in the glueboard or positioned adjacent to the glueboard. The housing may also include various grills, grates or decorative panels to prevent people from coming into contact with the adhesive coating of glueboard 10, to prevent viewing of the glueboard 10 and any pests trapped by the glueboard 10, or to prevent people from coming into contact with either the glueboard or light sources. Also, the housing 30 and glueboard 10 may have a variety of different shapes without deviating from the invention. Thus, it is intended that the invention only be limited by the language of the claims which are intended to cover what the claims literally describe and a fair range of equivalents.

What is claimed is:

1. A pest control device comprising:
   (a) a replaceable glueboard of a defined thickness having at least one edge extending between back and front surfaces, the front surface having a peripheral section adjacent the at least one edge and a central section, and an adhesive coating covering the central section;
   (b) a housing having a space in which the replaceable glueboard is received and retained, the space defined by at least one channel, the at least one channel having an opening into which the at least one edge of the glueboard is inserted and a lip for retaining the at least one edge of the glueboard within the at least one channel, the lip of the at least one channel and the peripheral section of the glueboard dimensioned so the adhesive coating of the glueboard does not come into contact with the lip as the glueboard is inserted into, retained within or removed from the space of the housing; and
   (c) a guide having an edge which engages the front surface of the glueboard as the glueboard is inserted into and removed from the space to prevent the adhesive coating covering the central section of the glueboard from coming into contact with other surfaces of the pest control device, the edge of the guide being sufficiently narrow to prevent the guide from sticking to the adhesive coating, wherein the guide comprises an axle having at least one wheel mounted thereon and the edge of the guide is an outer edge surface of the at least one wheel.

2. The pest control device of claim 1 wherein the axle is flexible to accommodate glueboards having differing defined thicknesses.

3. The pest control device of claim 1 wherein the at least one wheel comprises a plurality of wheels supported by the axle.

4. The pest control device of claim 1 wherein the housing has a second space in which a pest attractant is located adjacent the space in which the replaceable glueboard is received and the guide prevents the adhesive coating from coming into contact with the pest attractant as the glueboard is inserted and removed.

5. The pest control device of claim 4 wherein the pest attractant is a light source.

6. The pest control device of claim 1 further comprising a second guide engaging the glueboard.

7. The pest control device of claim 1 wherein the glueboard incorporates a pest attractant.

8. The pest control device of claim 1 wherein the space is further defined by a second channel having a second opening into which a second edge of the glueboard is inserted and a second lip for retaining the second edge of the glueboard within the second channel and wherein the second lip of the second channel and the peripheral section of the glueboard are dimension so the adhesive coating of the glueboard does not come into contact with the second lip of the second channel as the glueboard is inserted into, retained within or removed from the space of the housing.

9. A pest control device comprising:
   (a) a replaceable glueboard of a defined thickness having at least one edge extending between back and front surfaces, the front surface having a peripheral section adjacent the at least one edge and a central section, and an adhesive coating covering the central section;
   (b) a housing having a space in which the replaceable glueboard is received and retained, the space defined by at least one channel, the at least one channel having an opening into which the at least one edge of the glueboard is inserted and a lip for retaining the at least one edge of the glueboard within the at least one channel, the lip of the at least one channel and the peripheral section of the glueboard dimensioned so the adhesive coating of the glueboard does not come into contact with the lip as the glueboard is inserted into, retained within or removed from the space of the housing; and
   (c) a guide engaging and guiding the glueboard during insertion of the glueboard into and removal of the glueboard from the space of the housing, the guide comprising an axle and at least one wheel supported by the axle which engages the front surface of the glueboard as the glueboard is inserted into and removed from the space to prevent the adhesive coating covering the central section of the glueboard from coming into contact with other surfaces of the pest control device, the at least one wheel having an outer edge sufficiently narrow to prevent the at least one wheel from sticking to the adhesive coating.

10. A pest control device comprising:
    (a) a replaceable glueboard of a defined thickness having at least two edges extending between back and front surfaces, the front surface having a peripheral section adjacent the at least two edges and a central section, and an adhesive coating covering the central section;
    (b) a housing having a space in which the replaceable glueboard is received and retained, the space defined by at least first and second channels, each of said at least first and second channels having an opening into which a respective edge of said at least two edges of the glueboard is inserted and a lip for retaining the respective edge of said at least two edges of the glueboard inserted into the openings of the at least first and second channels, the lip of each of the first and second channels and the peripheral section of the glueboard dimensioned so the adhesive coating of the glueboard does not come into contact with the lips of the at least first and second channels as the glueboard is inserted into, retained within or removed from the space of the housing; and
    (c) a guide engaging and guiding the glueboard during insertion of the glueboard into and removal of the glueboard from the space of the housing, the guide comprising an axle and at least one wheel supported by the axle which engages the front surface of the glueboard as the glueboard is inserted into and removed from the space to prevent the adhesive coating covering the central section of the glueboard from coming into contact with other surfaces of the pest control device, the at least one wheel having an outer edge sufficiently narrow to prevent the at least one wheel from sticking to the adhesive coating.

* * * * *

UNITED STATES PATENT AND TRADEMARK OFFICE
CERTIFICATE OF CORRECTION

PATENT NO. : 8,341,874 B2
APPLICATION NO. : 12/832277
DATED : January 1, 2013
INVENTOR(S) : Bruce R. Studer and Timothy M. Jones It is certified that error appears in the above-identified patent and that said Letters Patent is hereby corrected as shown below:

Claim 8, column 6, line 5, the word "dimension" should read -- dimensioned --.

Signed and Sealed this
Nineteenth Day of February, 2013

Teresa Stanek Rea
*Acting Director of the United States Patent and Trademark Office*